(12) United States Patent
Lee et al.

(10) Patent No.: US 11,656,929 B2
(45) Date of Patent: May 23, 2023

(54) MEMORY MODULE AND OPERATING METHOD

(71) Applicant: SAMSUNG ELECTRONICS CO., LTD., Suwon-si (KR)

(72) Inventors: Mi Jin Lee, Seoul (KR); Dong-Yoon Kim, Hwaseong-si (KR); Min-Hyouk Kim, Hwaseong-si (KR); Sung-Joon Kim, Hwaseong-si (KR); Sung Up Moon, Seoul (KR); Jong Young Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/345,276

(22) Filed: Jun. 11, 2021

(65) Prior Publication Data

US 2022/0138049 A1 May 5, 2022

(30) Foreign Application Priority Data

Nov. 3, 2020 (KR) .................. 10-2020-0145259

(51) Int. Cl.
*G06F 11/07* (2006.01)

(52) U.S. Cl.
CPC ........ *G06F 11/0778* (2013.01); *G06F 11/073* (2013.01); *G06F 11/0772* (2013.01); *G06F 11/0784* (2013.01); *G06F 11/0787* (2013.01); *G06F 11/0793* (2013.01)

(58) Field of Classification Search
CPC ............. G06F 11/073; G06F 11/0772; G06F 11/0775; G06F 11/0778; G06F 11/0784; G06F 11/0787; G06F 11/0793; G06F 11/1048; G06F 11/1064; G06F 11/3037; G11C 2029/4402; G11C 29/44; G11C 29/42
See application file for complete search history.

(56) References Cited

U.S. PATENT DOCUMENTS

| | | | |
|---|---|---|---|
| 5,410,545 A * | 4/1995 | Porter | G06F 11/1044 |
| | | | 714/E11.041 |
| 6,463,550 B1 * | 10/2002 | Cepulis | G06F 11/006 |
| | | | 714/25 |
| 6,976,197 B2 | 12/2005 | Faust et al. | |
| 7,404,118 B1 | 7/2008 | Baguette et al. | |
| 9,785,570 B2 | 10/2017 | Hu et al. | |
| 9,836,348 B2 | 12/2017 | Ware et al. | |
| 9,965,005 B2 | 5/2018 | Kim et al. | |
| 10,318,455 B2 | 6/2019 | Chalfant | |
| 2003/0110426 A1 * | 6/2003 | Faust | G06F 11/1048 |
| | | | 714/E11.049 |
| 2005/0028038 A1 * | 2/2005 | Pomaranski | G06F 11/2268 |
| | | | 714/E11.147 |
| 2008/0022186 A1 * | 1/2008 | Co | G06F 11/1044 |
| | | | 714/763 |

(Continued)

*Primary Examiner* — Bryce P Bonzo
*Assistant Examiner* — Albert Li
(74) *Attorney, Agent, or Firm* — Volentine, Whitt & Francos, PLLC

(57) ABSTRACT

A memory module includes; dynamic random access memories (DRAMs), a controller configured to control operation of the DRAMs, and an active device configured, in response to detection of an error occurring in at least one of the DRAMs, to generate an interrupt and store error information corresponding to the error.

18 Claims, 8 Drawing Sheets

(56) References Cited

U.S. PATENT DOCUMENTS

| | | | |
|---|---|---|---|
| 2015/0212885 A1* | 7/2015 | Coteus | G06F 11/1048 |
| | | | 714/766 |
| 2017/0255383 A1* | 9/2017 | Chang | G06F 3/0652 |
| 2018/0314580 A1* | 11/2018 | Kelly | H03M 13/05 |
| 2020/0151048 A1 | 5/2020 | Shantamurthy et al. | |
| 2020/0341831 A1* | 10/2020 | Chen | G06F 11/3037 |

* cited by examiner

FIG. 7

| | Category | Contents | Purpose |
|---|---|---|---|
| CE | mcelog | System log by Fail address decode operation | log |
| | Header / CRC | | Check data reliability |
| | DRAM Address | CS/BA/BG/Row/Col | Check exact failure address |
| | System Information | MCA Status Register value | Check detailed system environment which can affect failure |
| | | MC Bank Number | |
| | | Frequency | |
| UE | | Page Policy | |
| | | Temperature | |
| | | Rank Error Count | |
| | | CPU Type | |
| | System Configuration | CE Threshold | Check detailed system situation about the failure |
| | | Leaky Bucket | |
| | | RAS Mode (SDDC+1/ADDDC/Mirror/Rank Sparing) | |
| | Time stamp for UE | | Check failure TAT |

MEMORY MODULE AND OPERATING METHOD

CROSS-REFERENCE TO RELATED APPLICATION

This application claims priority under 35 U.S.C. 119 from Korean Patent Application No. 10-2020-0145259 filed on Nov. 3, 2020 in the Korean Intellectual Property Office, the subject matter of which is hereby incorporated by reference.

BACKGROUND

1. Technical Field

The inventive concept relates generally to memory modules and operating methods for same. More particularly, the inventive concept relates to memory modules including volatile memory and operating methods for same.

2. Description of the Related Art

Different semiconductor memory devices use different, constituent semiconductor elements to store data. A semiconductor memory device may be broadly classified as a nonvolatile memory device or a volatile memory device. A nonvolatile memory device retains stored data even in the absence of applied power. Exemplary nonvolatile memory devices include read only memory (ROM), programmable ROM (PROM), electrically erasable programmable ROM (EEPROM), flash memory, phase-change random access (RAM) (PRAM), magnetic RAM (MRAM), resistive RAM (RRAM) and ferroelectric RAM (FRAM). In contrast, the integrity of data stored in a volatile memory is lost when applied power is interrupted. Exemplary volatile memory devices include static RAM (SRAM), dynamic RAM (DRAM) and a synchronous DRAM (SDRAM).

Volatile memory devices are particularly well suited to support high-speed, random data access applications, such as those typically associated with a main memory in a computing system (e.g., a personal computer, server or workstation). However, nonvolatile memory devices are well suited to support large quantity (or capacity), data storage applications, such as an auxiliary storage in a computing system.

SUMMARY

Embodiments of the inventive concept provide memory modules capable of storing error information associated with errors occurring in relation to the operation of volatile memory devices in an electronic system.

Embodiments of the inventive concept provide methods of operating memory modules capable of storing error information associated with errors occurring in relation to the operation of volatile memory devices in an electronic system.

In one aspect, embodiments of the inventive concept provide a memory module including; dynamic random access memories (DRAMs), a controller configured to control operation of the DRAMs, and an active device configured, in response to detection of an error occurring in at least one of the DRAMs, to generate an interrupt and store error information corresponding to the error.

In another aspect, embodiments of the inventive concept provide an electronic device including; a memory module including a volatile memory and an active device, and a central processing unit (CPU) connected to the memory module by a system bus. The active device is configured, in response to detection of an error occurring in the volatile memory, to generate an interrupt and store error information corresponding to the error.

In another aspect, embodiments of the inventive concept provide an operating method for a memory module including volatile memories, a controller, and an active device. The operating method includes; using the active device to periodically read an error log stored in a register, communicating an interrupt to the register when an error is detected with respect to operation of the memory module, receiving the error log from the register based in response to the interrupt and storing at least a portion of the error log as error information, and storing the error information in a nonvolatile memory.

However, aspects of the inventive concept are not restricted to those set forth herein. The above and other aspects of the inventive concept will become more apparent to one of ordinary skill in the art to which the inventive concept pertains by referencing the detailed description of the inventive concept given below.

BRIEF DESCRIPTION OF THE DRAWINGS

The above and other aspects and features of the inventive concept will become more apparent upon consideration of the following detailed description taken together with the accompanying drawings, in which:

FIG. 7 is a list illustrating exemplary error information that may be used in some embodiments of the inventive concept;

DETAILED DESCRIPTION

Hereinafter, certain embodiments of the inventive concept will be described with reference to the accompanying drawings.

Figure 1:
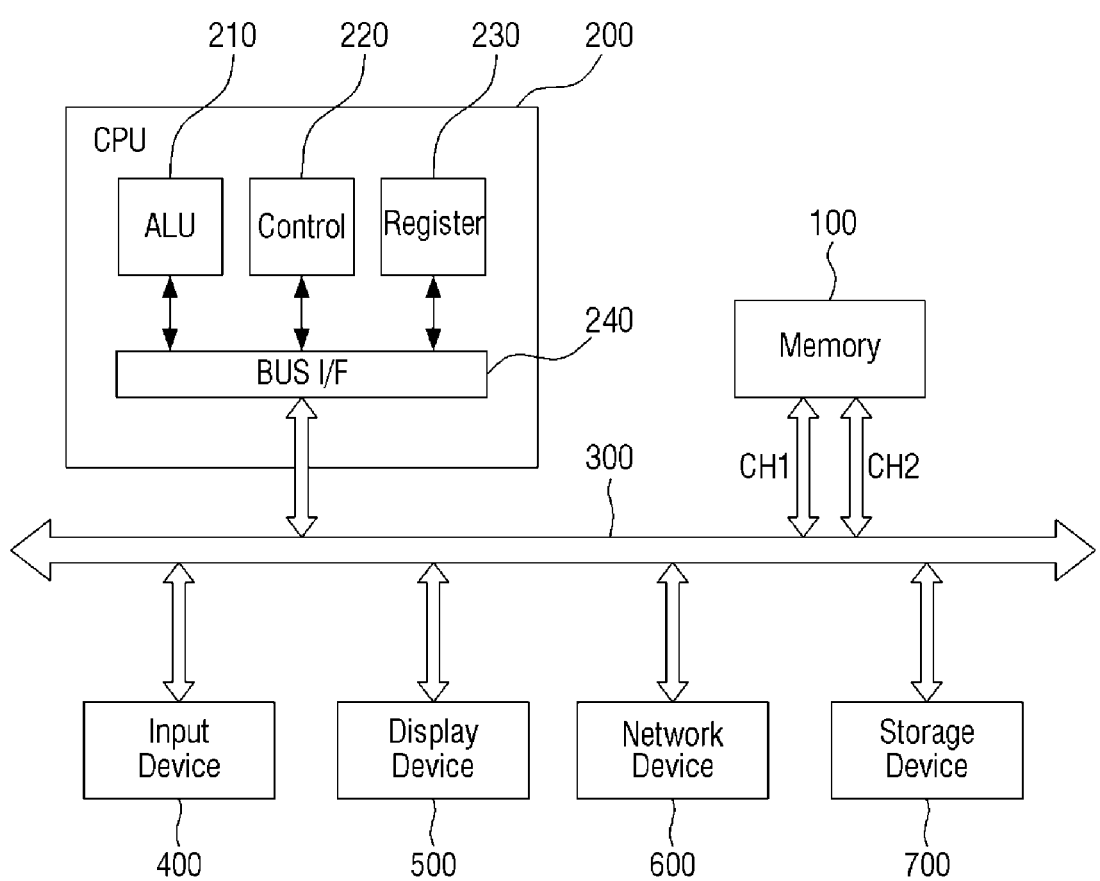
FIG. 1 is a block diagram illustrating an electronic device according to embodiments of the inventive concept.
Figure 2:
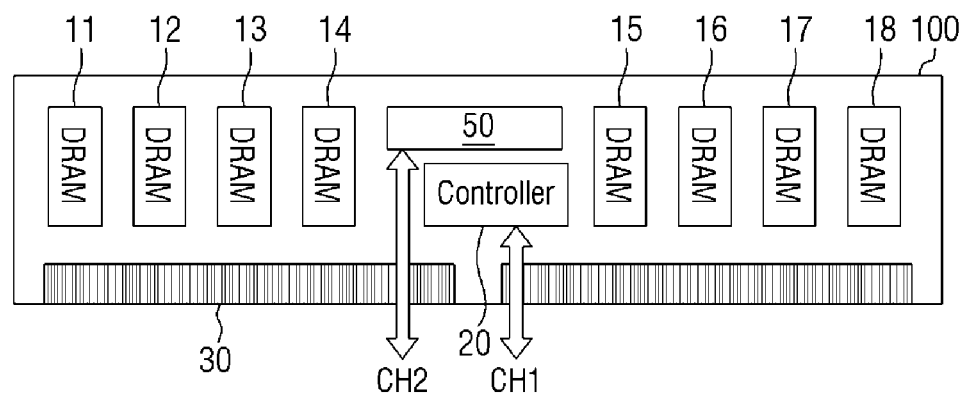
FIG. 2 is a block diagram further illustrating the memory module 100 of FIG. 1.

FIG. 1 is a block diagram illustrating an electronic device 1 according to embodiments of the inventive concept. FIG. 2 is a block diagram illustrating a memory module 100 as one example of the main memory device 100 of FIG. 1.

Referring to FIG. 1, the electronic device 1 may be variously implemented as (e.g.,) a personal computer (PC), a laptop, an ultra-mobile PC (UMPC), a workstation, a server, a net-book, a personal digital assistant (PDA), and a portable computer, a web tablet, a wireless phone, a mobile phone, a smart phone, a digital camera, a digital audio recorder, a digital audio player, a digital picture recorder, a digital picture player, a digital video recorder, a digital video player, a home network or another device or system capable of "communicating" (e.g., transmitting and/or receiving) information in hardwire and/or wireless environments.

In some embodiments, the electronic device 1 may include a main memory device 100, a central processing unit (CPU) 200, and a system bus 300. Within the electronic device 1 (or without the electronic device 1 in the case of an attachable/detachable component, or a communicating external component), various components may be connected to the CPU 200 and/or main memory device 100 via the system bus 300, such as an input device 400, a display device 500, a network device 600 and a storage device 700.

The main memory device 100 may be used to store data processed or communicated by the CPU 200. In some embodiments, the main memory device 100 may serve as a working memory for the CPU 200. Those skilled in the art will appreciate that the main memory device 100 may be variously configured. For example, the main memory device 100 may include one or more of a DRAM, a double data rate synchronous DRAM (or DDR SDRAM), a low power DDR SRAM (or LPDDR SDRAM), a graphics DDR (or GDDR), and a Rambus DRAM (or RDRAM), or any other type of volatile memory device requiring a refresh operation.

Here, the main memory device 100 may be fabricated, wholly or in part, as a semiconductor memory device. The processing speed of the main memory device 100 may be substantially faster than that of the storage device 700, which may include one or more nonvolatile memory device (s).

The CPU 200 may include various arbitrary processors, and may include device(s) capable of encoding and/or decoding instructions associated with the electronic device 1, device(s) capable of executing arithmetic and/or logical operations, and devices capable of variously processing data communicated by the electronic device 1. For example, in some embodiments, the CPU 200 may include a program counter, an arithmetic and logic unit (ALU) 210, a control unit 220, various registers 230, an instruction decoder, a timing circuit, a bus interface (I/F) 240, and the like.

Here, the ALU 210 may execute various arithmetic and/or logical operations in response to instructions associate with the electronic device 1.

In some embodiments, the register 230 may serve as a log used to track an operational state of the electronic device 1. That is, the control unit 220 may write data logging the operational state of the electronic device 1 in the register 230 in real time during the operation of the electronic device 1. For example, the register 230 may log various time information, such as times at which particular operations are performed. Thus, the register 230 may serve a polling register for a basic input/output system (BIOS), a register logging system events in relation to a baseboard management controller (BMC), etc.

The CPU 200 may include a single processing core or multiple processing cores. For example, the CPU 200 may include multiple two cores (dual-core), four cores (quad-core) or six cores (hexa-core). The CPU 200 may also include one or more cache memories (e.g., external and/or internal cache memories).

The input device 400 includes one or more device(s) capable of providing input data, address(es) and/or command(s) to the electronic device 1. For example, the input device 400 may include a keyboard, keypad, button, touch panel, touch screen, touch pad, touch ball, camera, microphone, gyroscope sensor, vibration sensor, piezoelectric element, temperature sensor, biometric sensor, etc.

The display device 500 includes one or more devices capable of providing output data to one or more circuits. For example, the display device 500 may include a liquid crystal display (LCD), organic light emitting diode (OLED) display, active matrix OLED (AMOLED) display, LED, speaker, motor, etc.

The network device 600 may include a communication device capable of communicating information with a device external to the electronic device 1. In this regard, the network device 600 may be a hardwired communication device and/or a wireless communication device.

The storage device 700 may be disposed external to the CPU 200 and the main memory 100. In some embodiments, the storage device 700 may serve as a supplemental memory in relation to the more limited storage capacity of the main memory device 100. The storage device 700 may be a nonvolatile memory safeguarding certain data when the electronic device 1 is turned off. As noted above, the data processing speed of the storage device 700 may be much slower than data processing speed of the main memory device 100, yet a great volume of data may be stored in a semi-permanent state by the storage device 700.

The storage device 700 may be variously implemented (e.g., as a hard-disk drive (HDD)). However, in some embodiments, the storage device 700 may be a semiconductor memory device, such as a solid state drive (SSD).

The bus 300 may include or be compatible with various communication protocols and/or communication links. Thus, in some embodiments, the bus 300 may be a system management bus (SMBus), inter-integrated circuit (I2C) bus, intelligent platform management interface (IPMI) compliant bus, Modbus, etc.

The main memory device 100 may be implemented as a memory module like the one shown in FIG. 2. When implemented as a memory module, the main memory device 100 may be readily attached to/detached from (or mounted within/demounted from) the electronic device 1. In this regard, one or more memory modules mounted within the electronic device 1 may be configured as the main memory devices 100.

The memory module (or main memory device) 100 shown in FIG. 2 includes multiple volatile memories (e.g., DRAMs 11, 12, 13, 14, 15, 16, 17 and 18—hereafter collectively, "DRAMs 11 to 18"), a controller 20, memory input/output (I/O) pins 30 and an active device 50. The memory module 100 may be used to write data, store data, retrieve (or read) data and/or erase data under the control of the CPU 200. For example, in the context of the illustrated example of FIG. 2, the CPU 200 may control the exchange of data with memory module 100 using one or more communication protocol(s) or technical standards established by JEDEC (see, www.jedec.com), such as JESD79F for DDR SDRAM and JESD209 for LPDDR, etc. In this regard, the CPU 200 may appropriately communicate command(s), address(es), control signal(s) and/or data to the memory module 100 during various data access operations (e.g., read operations and write operations).

The DRAMs 11 to 18 assumed in relation FIG. 2 (and hereafter in the written description) may be one or more of DRAM, SRAM, and/or SDRAM. Each of the DRAM 11 to 18 may communicate data (DQ) via a first channel CH1 under the control of the controller 20. In some embodiments, the memory module 100 may further include various buffers (not shown) typically used during communication of data (DQ) and/or various other signals. Here, data (DQ) may be communicated synchronously with data strobe signals (DQS).

In some embodiments, the controller 20 may communicate with the DRAMs 11 to 18 using at least one communication protocol or technical standard commonly associated with (e.g.,) a dual in-line memory module (DIMM), a registered DIMM (RDIMM), a load-reduced DIMM (LRDIMM), an unregistered DIMM (UDIMM), etc. Accordingly, the controller 20 of the memory module 100 may variously receive command(s), address(es), control signal(s), including one or more clock signal(s), and data via the first channel CH1 during data access operations of the main memory device 100, and may variously provide (or distribute) one or more of these signals to the DRAMs 11 to 18.

The active device 50 may monitor operational state(s) for each of the DRAMs 11 to 18, and may further store error information associated with the detection of an error occurring in relation to at least one of the DRAMs 11 to 18. Here, the detected "error" may be a data content error for data being written to or read from the at least one of DRAMs 11 to 18, a data communication error for data being communicated to/from the at least one of the DRAMs 11 to 18, etc. In some embodiments, the active device 50 may monitor operational states for the DRAMs 11 to 18 in real time. In other embodiments, the active device 50 may monitor operational states for the DRAMs 11 to 18 periodically or upon receipt of an external command Upon detecting the occurrence of an error (however monitored), the active deice 50 may note the occurrence by recording a corresponding time (or time period) in an "error log" kept (e.g.,) in the register 230. Accordingly, the active device 50 may report the occurrence of error(s) by reading the error log stored in the register 230. In this some embodiments, the error log may include multiple logs separately associated in the register 230 for each respective one of the DRAMs 11 to 18.

In some embodiments, upon detecting the occurrence of an error (e.g., by reading the error log), the active device 50 may transmit a corresponding control signal (e.g., hereafter, an "interrupt") to the CPU 200. And in response to the error interrupt, the CPU 200 may cause notation of the error in the error log (e.g., update the error log in the register 230), if it has not already been logged. Thereafter, the active device 50 may receive an updated copy of the error log from the CPU 200 as "error information."

In this regard it should be noted that the active device 50 may detect abnormal operation of the memory module 100 and communicate an interrupt through a second channel CH2 in order to receive error information from the CPU 200.

In some embodiments, the second channel CH2 may be a separate channel from the first channel CH1. For example, the first channel CH1 may connect the system bus 300 to the controller 20, and the second channel CH2 may connect the system bus 300 to the active device 50. Accordingly, if the electronic device 1 (or the CPU 200) should shut down and the first channel CH1 become unusable due to the occurrence of an error, the active device 50 may nonetheless perform operation(s) relevant to the error occurrence using the second channel CH2.

Figure 3:
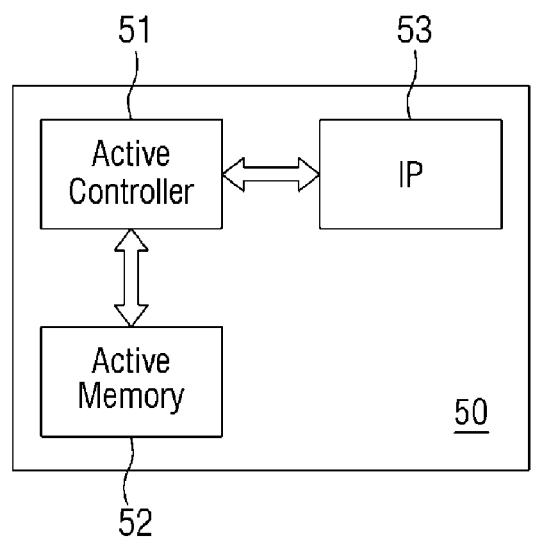
FIGS. 3 and 4 are respective block diagrams illustrating in various embodiments the active 50 of FIG. 2.
Figure 4:
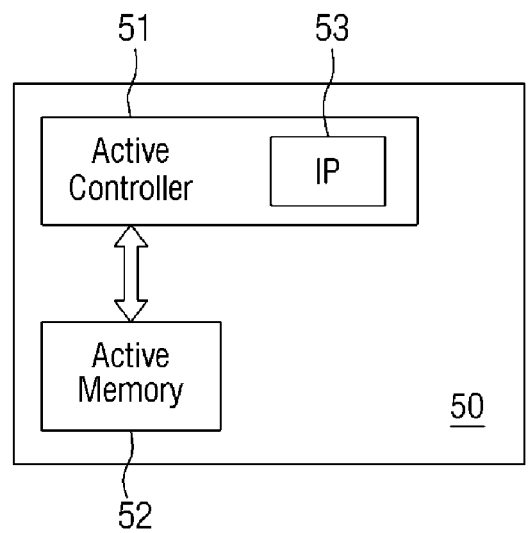
Figure 5:
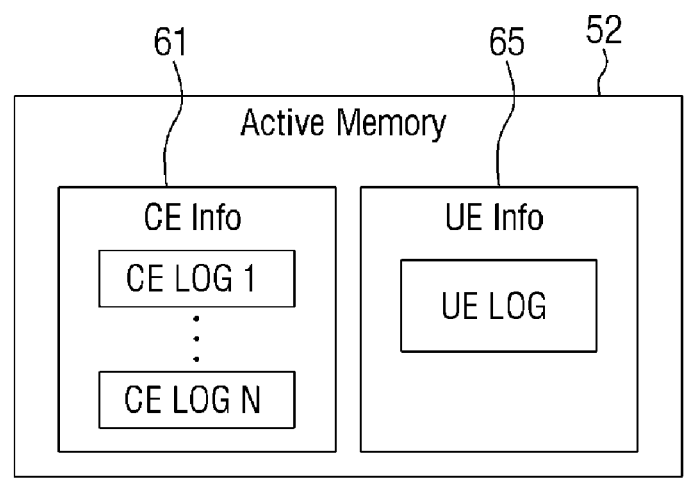
FIGS. 5 and 6 are respective block diagrams illustrating in various embodiments the active memory of FIGS. 3 and 4.
Figure 6:
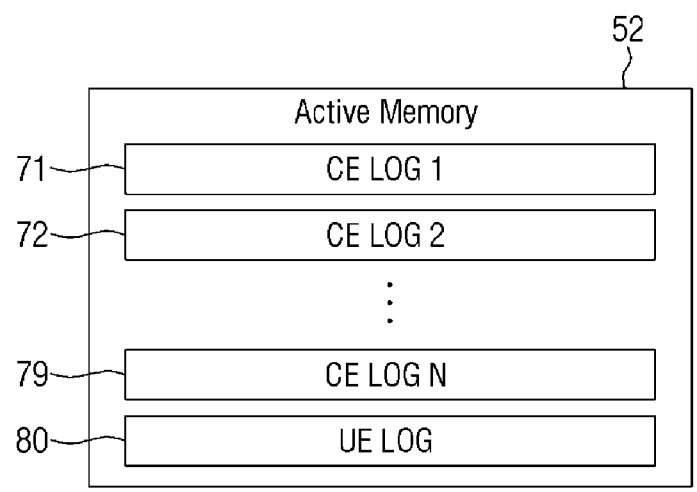

FIGS. 3 and 4 are respective block diagrams further illustrating in different examples the active device 50 of FIG. 2, and FIGS. 5 and 6 re respective block diagrams further illustrating in different examples the active memory 52 of FIG. 3.

Referring to FIG. 3, the active device 50 may include an active controller 51 and an active memory 52. Here, the active controller 51 may periodically monitor the operational state of the DRAMs 11 to 18, and output an interrupt to the CPU 200 when an error occurs in at least one of the DRAMs 11 to 18. In some embodiment, the active controller 51 may periodically read the error log stored in the register 230 in order to monitor the operational states of the DRAMs 11 to 18. Alternately, the active controller 51 may periodically check (or pole) each of the DRAMs 11 to 18 in order to determine its operational state, and/or receive operational state information from the controller 20.

When an error occurrence is detected as the result of monitoring, the active controller 51 may output an interrupt to the CPU 200. In some embodiments, the interrupt may change the BIOS in the CPU 200 in order to log system analysis data depending on whether the detected error is a correctable error (CE) or an uncorrectable error (UE).

In this regard, the active controller 51 may receive an error log entry associated with the interrupt from the CPU 200 and store the error log entry in the active memory 52. For example, in the case of a correctable error (CE), the active controller 51 may receive corresponding error information from a machine check model-specific register (MSR) (e.g., an error-reporting bank register), a corrected error count register, and/or a retry_rd_err_log register. In the case of an uncorrectable error (UE), the active controller 51 may receive the system event log as corresponding error information. Thus, the active memory 52 may store the one or more types of error information. Alternately or additionally, the active memory 52 may store the initial information, device information, module configuration (and/or type) information, data storage capacity information, execution environment information, operational logs, and the like associated the memory module 100. In this regard, the active memory 52 may be a nonvolatile memory.

In some embodiments, the active memory 52 may distinguish and store various error information according to by error types. For example, as shown in FIG. 5, the active memory 52 may distinguish and separately store error information associated with a correctable first error 61 and an uncorrectable second error 65. In the case of the correctable first error 61 (i.e., upon occurrence of the first error 61), operation of the memory module 100 and electronic device 1 may continue with competent error correction of the first error 61. Accordingly, correctable (or first type) error information (e.g., CE LOG 1 to CE LOG N) may be cumulatively stored in the active memory 52. However, in the case of the uncorrectable second error 65 (i.e., upon the occurrence of the second error 65, the CPU 200 and/or the electronic device 1 is immediately shut down once the corresponding second error information (UE LOG) is stored in the active memory 52.

In some embodiments, the active memory 52 may store error information in an order in which it is received from the CPU 200 (e.g., a sequence of receipt) or in an order in which errors were detected (e.g., a sequence of occurrence). For example, as illustrated in FIG. 6, the active memory 52 may store error information in temporal order. That is, since correctable first errors (e.g., CE LOG 1 to CE LOG N) 71 to 79 are continuously used to perform error correction in relation to the DRAMs 11 to 18, the correctable first errors may be logged in temporal order. However, the uncorrectable second error (e.g., UE LOG) 80 may be stored as error information immediately before system shutdown.

In some embodiments, the active device 50 may include a communication internet protocol (IP) 53. The communication IP 53 allows an external device (not shown) to access data stored in one or more of the DRAMs 11 to 18 using the capabilities of the memory module 100. For example, the communication IP may allocate network protocol addresses to each of the DRAMs 11 to 18, and the active device 50 may then allow the external device to directly access DRAMs 11 to 18 using these allocated addresses. The communication IP 53 may be implemented as a separate chip relative to the active controller 51 and the active memory 52 of FIG. 3. Alternately, the communication IP 53 may be implemented using functionality provided by the active controller 51 and the active memory 53 of FIG. 4. Here, the communication IP 53 may be connected to the external device through an input/output (I/O) bus that may be used communicate error information stored in the active memory 52 to the external device.

The memory module (or main memory device) 100 including the active device 50 according to embodiments of the inventive concept is capable of checking for error(s) in real time and analyzing the type of error and/or the cause of error using error information stored in the active memory 52, thereby improving overall reliability, availability, and serviceability (RAS) of the electronic device 1.

FIG. 7 is a table listing exemplary error information that may be used in relation to embodiments of the inventive concept.

Here, as before, the correctable first error (CE) is an error that may be corrected using error correction capabilities associated with the memory module 100. In this regard, the correctable first error (CE) may detected by the CPU 200. In some embodiments, the correctable first error (CE) may be an error occurs in one of the DRAMs 11 to 18.

In contrast, the uncorrectable second error (UE) is an error that may not be corrected using the error correction capabilities associated with the memory module 100. Here again, the uncorrectable second error (UE) may be detected by the CPU 200. For example, the uncorrectable second error (UE) may include (e.g.,) errors occurring in two or more DQs and similar fatal error(s) causing a system halt or a system reset. In some embodiments, the uncorrectable second error (UE) may include errors exceeding a maximum CE threshold, or errors resulting when RAS features do not cover the system.

Referring to the illustrated example of FIG. 7, in the case of the correctable first error (CE), address information (e.g., a fail address) in at least one of the DRAMs 11 to 18 associated with the correctable first error (CE) and the error log (e.g., an operational log or system log) associated with the DRAMs 11 to 18 may be read from the register 230 and stored as first error information. Here, in some embodiments, the active device 50 may store the first error information using a system management interrupt (SMI) service route by the BIOS whenever the correctable first error (CE) occurs. Alternately, the active device 50 may access the register 230 to read (wholly or in part) the error log (e.g., one or more system event logs) and then store the error log in the active memory 52.

In the case of the uncorrectable second error (UE) the corresponding error information may include at least one of header information, cyclic redundancy check (CRC) information, address information (e.g., DRAM address) associated with the uncorrectable second error (UE), system information, system type and/or configuration, time information (e.g., a timestamp associated with the UE), etc.

Figure 8:
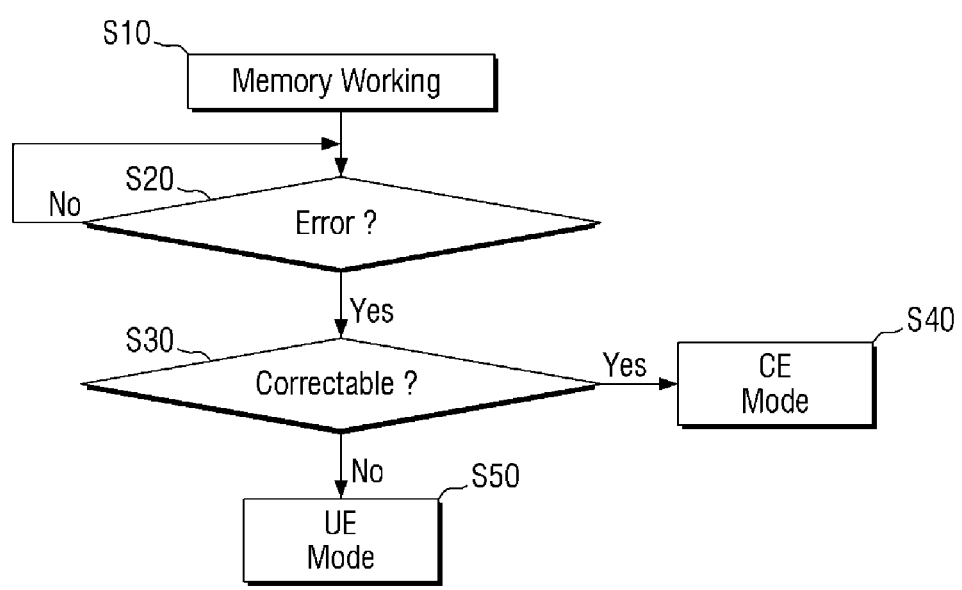
FIGS. 8 and 9 are flowcharts illustrating in various embodiments methods of operating the active device of FIG. 2.
Figure 9:
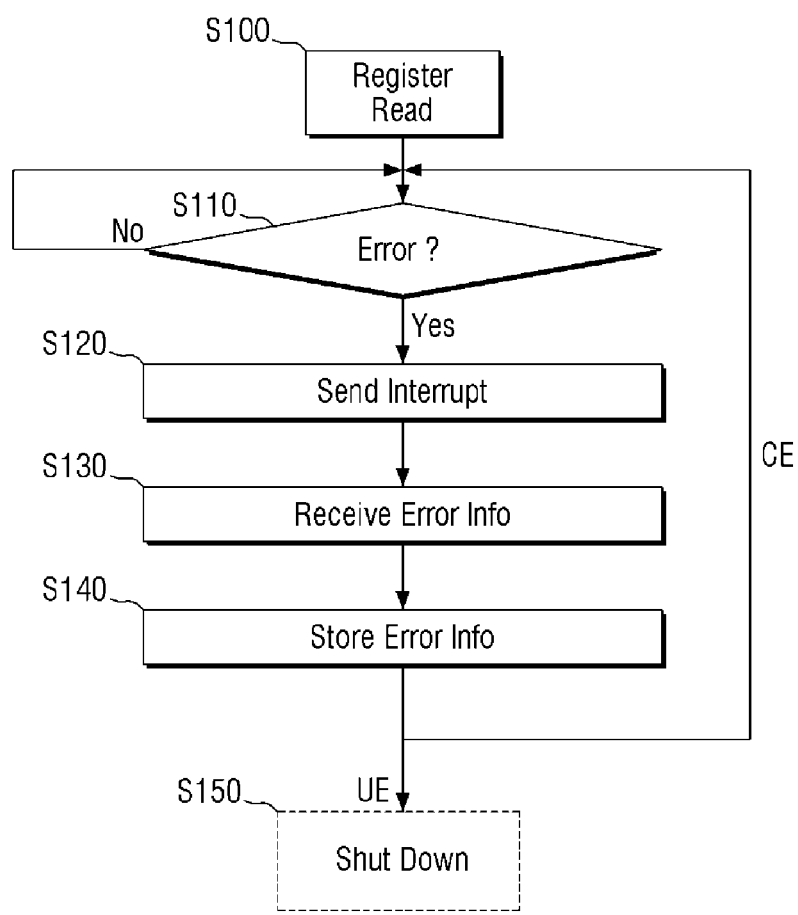

FIGS. 8 and 9 are respective flowcharts illustrating in one example a method of operating the active device 50 of FIG. 2.

Referring to FIGS. 1, 2 and 8, the memory module (or main memory device) 100 performs memory operations in response to command(s), address(es), control signal (s0 and/or data provided by the CPU 200 (S10). Upon detecting an error (S20=YES), the active device may determine whether or not the detected error is correctable (S30). If it is determined that the error is correctable (S30=YES), then error correction may be performed and error information may be stored in accordance with a correctable error (CE) mode (S40). Else, if it is determined that the detected error is not correctable (S30=NO), then error information may be stored in accordance with an uncorrectable error (UE) mode (S50).

Referring to FIGS. 1, 2 and 9, in some embodiments of the inventive concept, the active device 50 may monitor the operational states of the DRAMs 11 to 18 by periodically reading an error log stored in the register 230 (S100). If an error is detected during this monitoring step (S110=YES), an interrupt may be communicated to the register 230 (S120). Here, the type of interrupt may vary depending on whether the error is determined to be correctable or uncorrectable. For example, in some embodiments, the interrupt may be sent only when the error is deemed an uncorrectable error.

In response to the interrupt, the register 230 may communicate error information to the active device 50. For example, in the error log stored in the register 230 stores multiple system (or component) logs, only those system logs relevant to the interrupt may be communicated to the active device 50. Upon receiving the error log (wholly or in part) (S130), the active device 50 may store the error log as error information (S140). If the error is an uncorrectable second error (UE), the CPU 200 or the electronic device 1 associated with the memory module 100 will shut down (S150). However, if the error is a correctable first error (CE), error correction may be performed or a read retry may be performed on data stored in one or more of the DRAMs 11 to 18.

Figure 10:
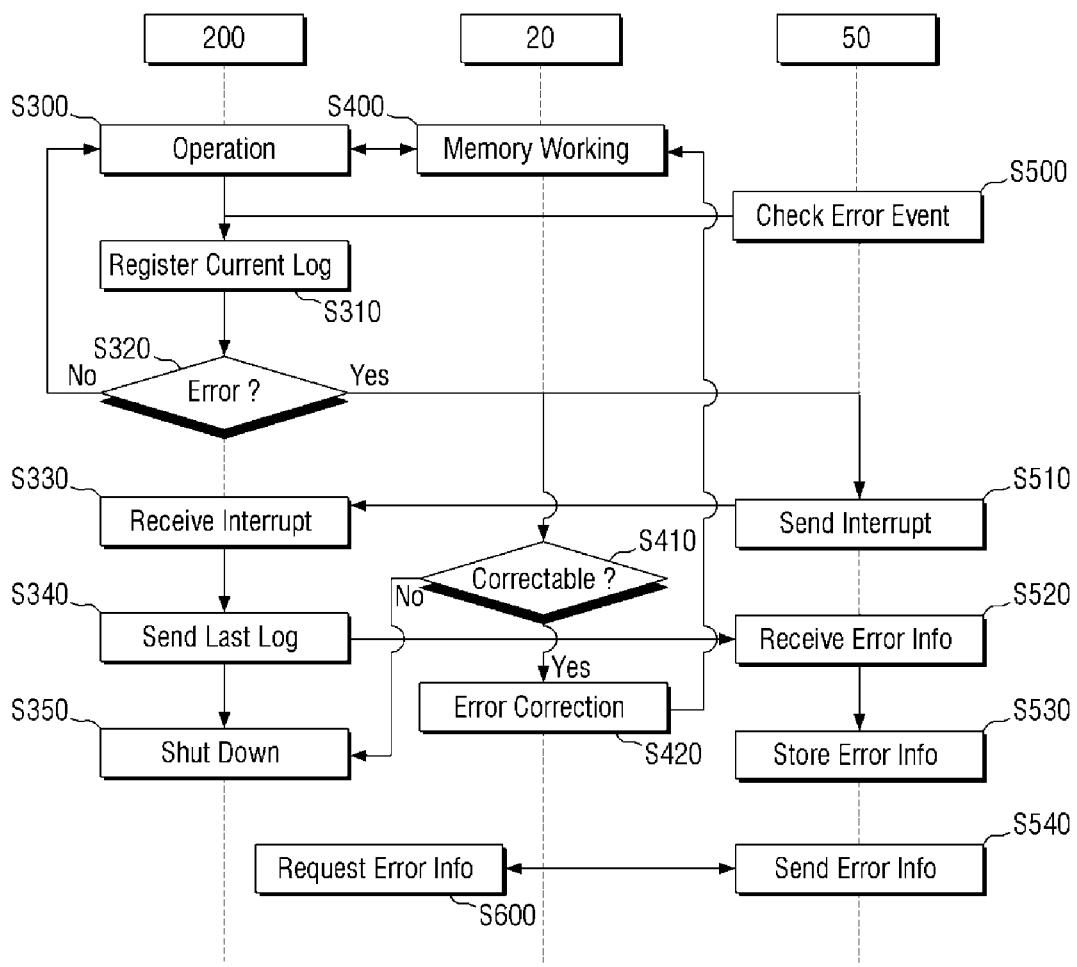
FIG. 10 is a flowchart illustrating in one example a method of operating the electronic device of FIG. 1.

FIG. 10 is a flowchart illustrating in one example a method of operation for the electronic device 1 of FIG. 1.

Referring to FIGS. 1 and 10, the CPU 200 operates in response to command(s), address(es), control signal(s) and/or data received from a component within the electronic device 1 or an external source (S300). In response to operation by the CPU 200, the memory module 100 may perform a memory operation (S400). In this regard, the CPU 200 may record (or update)—in real time—an operational state for the memory module 100 (S310), and further in this regard, the active device 50 may access the CPU 200 in order to monitor whether an error occurs (S500).

If a correctable error occurs during the memory operation (S320 and S410), the CPU 200 instructs the controller 20 to perform an error correction operation, a read retry operation or the like, and the controller 20 does so (S420).

The active device 50 may communicate an interrupt to the CPU 200, and the CPU 200 may receive the interrupt (S330) and, in response to the interrupt, communicate an error log (S340). In some embodiments, the communicated error log may be a last updated set of system log(s). The active device 50 receives the error log (S520) and stores the contents of the error log (wholly or in part) as error information (S530). Alternately, the active device may not output the interrupt to the CPU 200 but may store the error log corresponding to the error occurrence among the periodically read logs as error information (S530).

If an uncorrectable error occurs during the memory operation (S320 and S410), the system will shut down (S350). However before system shut down, the active device 50 immediately communicates an interrupt (S510), and the CPU 200—upon receipt of the interrupt from the active device (S330), communicates the error log corresponding to the error occurrence (S340). The active device 50 receives the error log (S520) and stores the content of the error log (wholly or in part) as error information (S530).

Further in this regard, when the active device receives an access request to the active memory 52 from the external device (S600), it may transmit the stored error information to the external device.

The making and use of the inventive concept has been described in relation to certain embodiments thereof. However, the scope of the inventive concept is not limited to only the illustrated embodiments. Those skilled in the art will appreciate that many variations and modifications may be made to the illustrated and described embodiments without materially departing from the scope of the inventive concept as defined by the following claims.

What is claimed is:

1. A memory module comprising:
   dynamic random access memories (DRAMs);
   a controller, wherein the controller controls operation of the DRAMs; and
   an active device circuit that, in response to detection of an error occurring in relation to at least one of the DRAMs, generates an interrupt and stores error information corresponding to the error,
   the error information comprising an error log received responsive to the interrupt,
   the active device circuit comprising
   an active controller, wherein the active controller communicates the interrupt to a Central Processing Unit (CPU) including a register, and
   a nonvolatile memory configured to receive the error log stored in the register, and store the error log as the error information.

2. The memory module of claim 1, wherein the active device circuit is further configured to periodically monitor error occurrence with respect to operation of the DRAMs.

3. The memory module of claim 1, wherein the active device circuit is further configured to distinguish and store the error information according to a correctable first error and an uncorrectable second error.

4. The memory module of claim 1, further comprising:
   a first channel configured to connect the controller of the DRAMs to a system bus;
   and a second channel configured to connect the active device circuit to the system bus.

5. The memory module of claim 1, wherein the active device circuit includes a communication internet protocol (IP) circuit that communicates an allocated address for at least one of the DRAMs.

6. The memory module of claim 5, wherein the communication IP circuit is separately configured with respect to the active controller.

7. The memory module of claim 1, wherein the nonvolatile memory is further configured to sequentially store error information associated with multiple correctable errors.

8. The memory module of claim 1, wherein the error is an uncorrectable error, and operation of the CPU is shut down in response to the interrupt once the nonvolatile memory stores the error information.

9. An electronic device comprising:
   a memory module including a volatile memory and an active device circuit; and
   a central processing unit (CPU) connected to the memory module by a system bus,
   wherein the active device circuit, in response to detection of an error occurring in the volatile memory, generates an interrupt and stores error information corresponding to the error,
   the error information comprising an error log received responsive to the interrupt,
   the CPU comprises
   a processor configured to access data stored in the volatile memory, and
   a register configured to store the error log for the memory module.

10. The electronic device of claim 9, wherein the active device circuit comprises:
    an active controller, wherein the active controller communicates the interrupt to the CPU; and
    a nonvolatile memory configured to receive the error log and store the error log as the error information.

11. The electronic device of claim 10, wherein if the error is a correctable error, the active controller receives address information in the volatile memory associated with the error and stores the address information in the nonvolatile memory as error information.

12. The electronic device of claim 11, wherein if the error is an uncorrectable error, the active controller communicates the interrupt to the CPU, the CPU reads an operational log stored in the register in response to the interrupt, and the electronic device shuts down.

13. The electronic device of claim 12, wherein the operation log includes at least one of header information, cyclic redundancy check (CRC) information, address information in the volatile memory associated with the error, system information, system type information, system configuration information and time information.

14. The electronic device of claim 13, wherein the memory module further includes:
    a first channel configured to connect the active device to the system bus and communicate the interrupt from the active controller to the CPU; and
    a second channel configured to connect a controller of the volatile memory to the system bus.

15. An operating method for a memory module including volatile memories, a controller, and an active device, the operating method comprising:
    using the active device to periodically read an error log stored in a register;
    communicating an interrupt to the register when an error is detected with respect to operation of the memory module;
    receiving the error log from the register based in response to the interrupt and storing at least a portion of the error log as error information; and
    storing the error information in a nonvolatile memory.

16. The operating method of claim 15, further comprising:
    determining that the error is a correctable error;
    receiving address information for a volatile memory among the volatile memories associated with the error, an operational log for the volatile memory, and time information associated with the error; and
    performing an error correction operation on the error using the address information, the operational log and the time information.

17. The operating method of claim 16, wherein the active device is configured to cumulatively and sequentially stores error information associated with multiple errors respectively determined to be correctable errors.

18. The operating method of claim 15, further comprising:
    determining that the error is an uncorrectable error; and
    shutting down a system including the memory module after storing the error information.

* * * * *